United States Patent
Yeh

(10) Patent No.: US 10,248,339 B2
(45) Date of Patent: Apr. 2, 2019

(54) DATA STORAGE DEVICE AND DATA STORAGE METHOD FOR DETECTING CURRENTLY-USED LOGICAL PAGES

(71) Applicant: Silicon Motion, Inc., Jhubei, Hsinchu County (TW)

(72) Inventor: Szu-I Yeh, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/623,586

(22) Filed: Jun. 15, 2017

(65) Prior Publication Data

US 2018/0011646 A1 Jan. 11, 2018

(30) Foreign Application Priority Data

Jul. 5, 2016 (TW) .............................. 105121193 A

(51) Int. Cl.
*G06F 3/06* (2006.01)
*G06F 12/02* (2006.01)
*G06F 11/10* (2006.01)

(52) U.S. Cl.
CPC ............ *G06F 3/0619* (2013.01); *G06F 3/065* (2013.01); *G06F 3/067* (2013.01); *G06F 3/0679* (2013.01); *G06F 11/1068* (2013.01); *G06F 12/0246* (2013.01); *G06F 2212/1008* (2013.01); *G06F 2212/1016* (2013.01); *G06F 2212/1032* (2013.01); *G06F 2212/7201* (2013.01); *G06F 2212/7202* (2013.01); *G06F 2212/7204* (2013.01)

(58) Field of Classification Search
CPC ........ G06F 3/0619; G06F 3/065; G06F 3/679; G06F 11/1068; G06F 12/0246
See application file for complete search history.

(56) References Cited

U.S. PATENT DOCUMENTS

| 9,442,834 B2 | 9/2016 | Huang et al. |
| 2013/0304972 A1* | 11/2013 | Aso .................... G06F 12/0246 711/103 |
| 2014/0140142 A1 | 5/2014 | Ko et al. |
| 2016/0062908 A1 | 3/2016 | Shen et al. |
| 2017/0249245 A1* | 8/2017 | Ishikawa ............. G06F 12/0246 |

FOREIGN PATENT DOCUMENTS

| TW | 201407349 A | 2/2014 |
| TW | I512462 B | 12/2015 |
| TW | 201610676 A | 3/2016 |

* cited by examiner

*Primary Examiner* — Than Nguyen
(74) *Attorney, Agent, or Firm* — McClure, Qualey & Rodack, LLP

(57) ABSTRACT

A data storage device utilized for storing a plurality of data includes a memory and a controller. The memory includes a plurality of blocks, and each of the blocks includes a plurality of physical pages. The controller is coupled to the memory and maps the logical pages to the physical pages of the memory. When the controller detects that a first logical page of the logical pages is a currently-used logical page, it detects whether or not the second logical page which belongs to the last logical page of the first logical page is a currently-used logical page in order to find what is truly the last currently-used logical page.

17 Claims, 4 Drawing Sheets

DATA STORAGE DEVICE AND DATA STORAGE METHOD FOR DETECTING CURRENTLY-USED LOGICAL PAGES

CROSS REFERENCE TO RELATED APPLICATIONS

This Application claims priority of Taiwan Patent Application No. 105121193 filed on Jul. 5, 2016, the entirety of which is incorporated by reference herein.

BACKGROUND OF THE INVENTION

Field of the Invention

The disclosure generally relates to a data storage device and a data storage method, and more particularly, to a data storage method which detects logical pages to discover the one that is truly the last currently-used logical page.

Description of the Related Art

When a data storage device (such as FLASH memory) is utilized by a user, power to the device might abnormally or accidentally turn off during the process of writing data. In these situations, not only will the page being written be affected, but other pages related to that page will also be affected. When the data storage device is detected by the controller to discover the actual last currently-used page, there could be misjudging caused by the other affected pages.

For example, other affected pages are actually blank pages on which data is not written. However, the controller determines that the page is the currently-used page because of the effect of the abnormal power-off. Accordingly, problems might occur when writing subsequent data. Therefore, what is needed are a data storage device and a data storage method for effectively detecting pages and discovering the actual last currently-used page.

BRIEF SUMMARY OF THE INVENTION

In order to solve the aforementioned problem, the invention proposes a data storage device and a data storage method to effectively determine whether a page is truly currently-used or not. Specifically, when a currently-used logical page is detected, the page of the previous address of the detected page will be further inspected to determine whether it is currently-used or not by the data storage device and data storage method provided. When the page of the previous address is a blank page, it means that the page is not the real currently-used page. Therefore, the data storage device and data storage method of the present invention can avoid misjudgments and accurately discover the actual last currently-used page.

In one aspect of the invention, the present invention provides a data storage device utilized for storing a plurality of data. The data storage device includes a memory and a controller. The memory includes a plurality of blocks. Each of the blocks includes a plurality of physical pages. The controller is coupled to the memory and maps a plurality of logical pages to the physical pages of the memory. When the controller detects that a first logical page of the logical pages is a currently-used logical page, the controller detects whether a second logical page of previous logical address of the first logical page is a currently-used logical page or not, to discover the last currently-used logical page of the logical pages.

When the controller detects that the second logical page is not the currently-used logical page, the controller determines that the first logical page is a misjudged currently-used logical page, and keeps detecting whether a third logical page of previous logical address of the second logical page is the currently-used logical page or not. When the controller detects that the second logical page is the currently-used logical page, the controller determines that the first logical page is truly the last currently-used logical page. When the controller detects that the third logical page is the currently-used logical page, the controller determines that the second logical page is truly the last currently-used logical page. When the controller detects that the third logical page is not the currently-used logical page, the controller determines that the second logical page is the misjudged currently-used logical page, and keeps detecting whether a fourth logical page of previous logical address of the third logical page is the currently-used logical page or not.

The controller sequentially detects whether each of the logical pages is the currently-used logical page or not according to a leaping linear search or a binary search. The first logical page and the second logical page belong to different word lines. When not every bit of the logical page is 1, the controller determines that the logical page is the currently-used logical page. Whether each bit of the logical page is 1 or not is determined by hardware. When ECC occurs on the logical page, the controller determines that the logical page is the currently-used logical page.

In another aspect of the invention, the present invention provides a data storage method utilized for a host and a data storage device for storing a plurality of data. The data storage device includes a memory and a controller, the controller maps a plurality of logical pages to the physical pages of the memory. The data storage method includes detecting whether a first logical page of the logical pages is a currently-used logical page or not; when the first logical page of the logical pages is detected to be the currently-used logical page, detecting whether a second logical page of previous logical address of the first logical page is a currently-used logical page or not, to discover the last currently-used logical page of the logical pages.

BRIEF DESCRIPTION OF DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
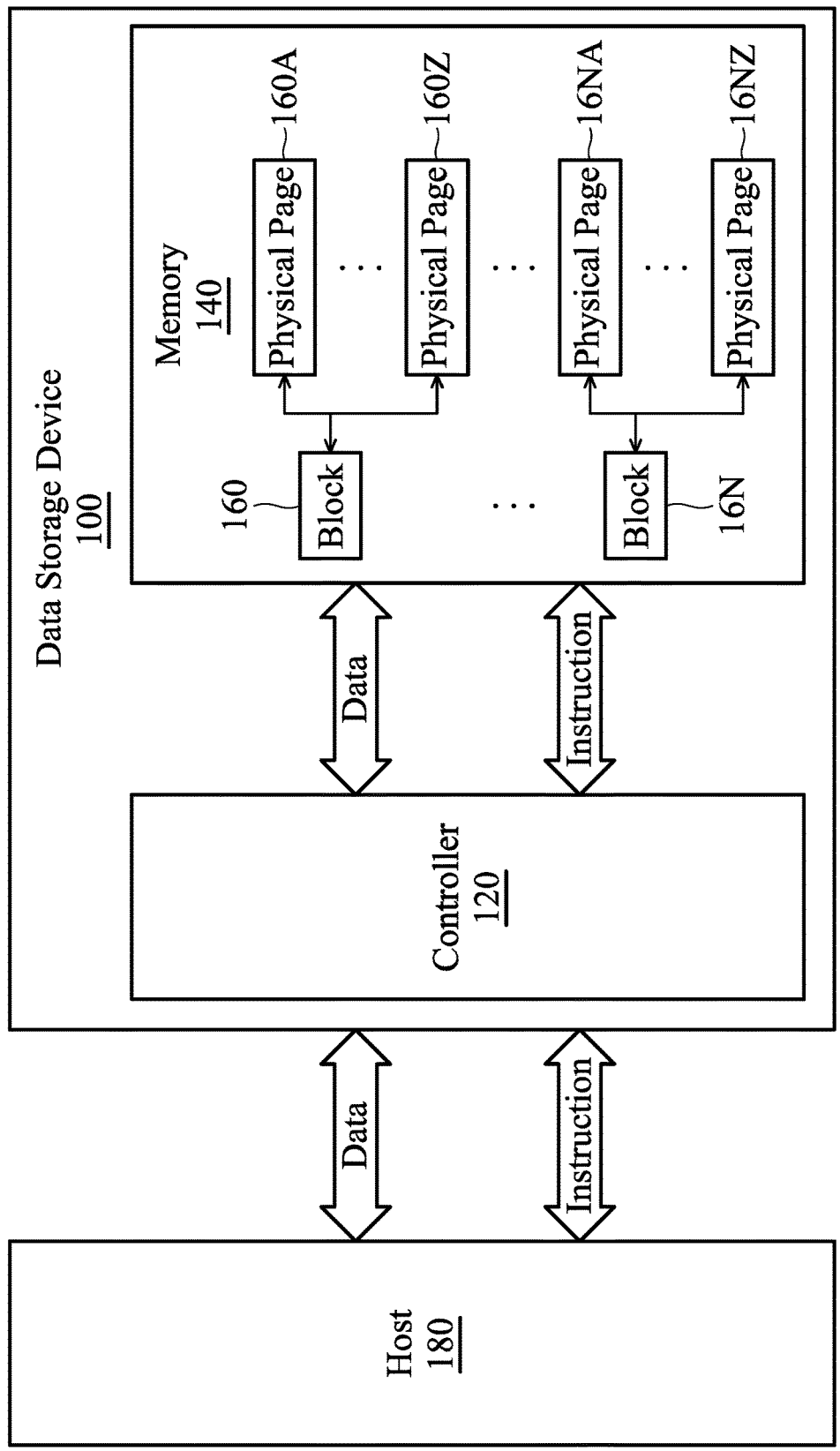
FIG. 1 is a schematic diagram of a data storage device and a host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a data storage device 100 and a host 180 according to an embodiment of the invention. In one embodiment, the data storage device 100 includes a controller 120 and a memory 140. The data storage device 100 is coupled to the host 180 to transmit data and instructions or to receive data and instructions. The memory 140 could be non-volatile memory such as NAND flash. The host 180 could be a mobile phone, a tablet computer, a laptop computer, a navigation device or in-vehicle system.

As shown in FIG. 1, the memory 140 includes a plurality of blocks 160A~160N. Specifically, each of the blocks 160A~160N further includes a plurality of physical pages 160A~16NZ. The block 160 includes physical pages 160A~160Z, and the block 16N includes physical pages 16NA~16NZ. When the controller 120 performs a writing operation or a programming operation on the memory 140, it controls the memory 140 to perform the writing or programming operation with the unit of a physical page. The controller 120 performs a reading operation on the memory 140 by controlling the memory 140 with the unit of a cluster. In addition, the controller 120 is coupled to the memory 140 to transmit data and instructions or to receive data and instructions mutually. Furthermore, the controller 120 can be a read-only-memory (ROM) and a micro-controller with firmware code, and the micro-controller executes the firmware code to operate or access the memory 140.

Regarding the memory 140, each of the physical pages 160A~16NZ has a different physical address. In other words, each of the physical pages 160A~16NZ has a physical address, and each physical address of the physical pages 160A~16NZ is different. When a writing operation is executed by the data storage device 100, the controller 120 determines the physical address of the memory 140 for writing or storing data. In addition, the physical addresses are mapped to a plurality of respective logical addresses by the controller 120. Therefore, for the host 180, the host 180 reads or writes data which is stored in a logical address by the data storage device 100 through the logical address.

The controller 120 maps logical pages to the physical pages of the memory 140 based on the sequence of the logical pages, and detects status of data stored by the above physical pages corresponding to the memory 140. In one embodiment, the controller 120 detects whether or not each of the logical pages is a currently-used logical page according to a leaping linear search or a binary search. When each bit of a logical page is 1, the controller 120 determines that the logical page is blank page; when not every bit of a logical page is 1, the controller 120 determines that the logical page is a currently-used logical page. Specifically, whether each bit of the above logical page is 1 or not is determined by hardware.

In another embodiment, when ECC occurs on the logical page, the controller 120 determines that the logical page is the currently-used logical page. For example, specifically, the controller 120 detects the ECC bit number of the above logical page to determine whether data stored in the logical page is error. When ECC bit number is low, the controller 120 determines that the data is correct, and the ECC recovery is successful. When ECC bit number is high, the controller 120 determines that the data is wrong, and the ECC recovery fails. It should be noted that the controller 120 determines that the logical pages is currently-used no matter the ECC bit number is high or low, or the ECC recovery is successful or not.

Whether a logical page is currently-used or not could be determined by the controller 120 with the above method. However, the currently-used logical page determined by the controller 120 might not be the real currently-used logical page, and it is misjudged as the currently-used logical page because of the abnormal power-off. Therefore, a data storage device and a data storage method for detecting pages efficiently are needed to confirm that the currently-used logical page determined by the controller 120 is real currently-used page with written data.

Figure 2:
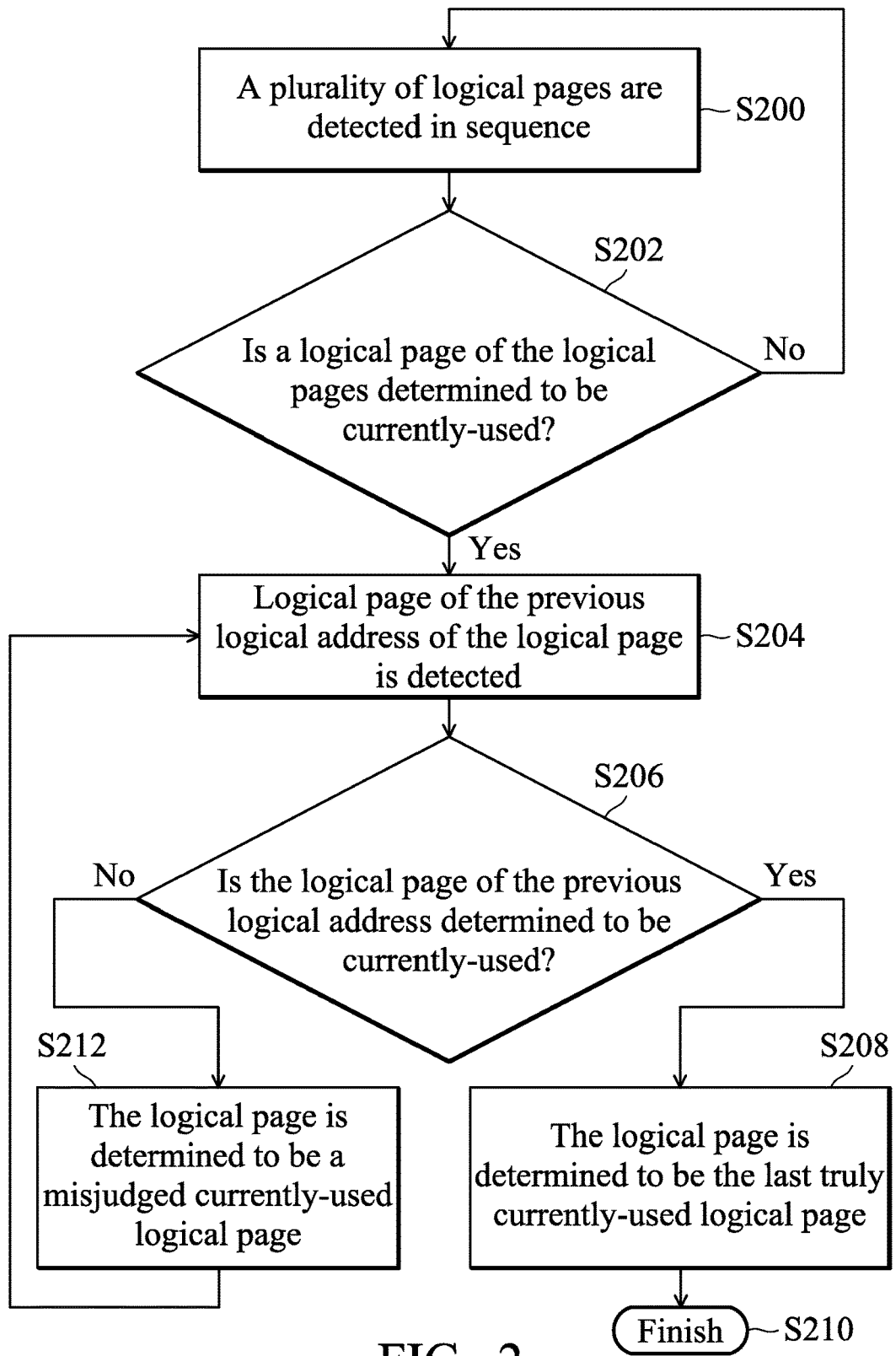
FIG. 2 is a flowchart of a data storage method according to an embodiment of the invention.

FIG. 2 is a flowchart of a data storage method according to an embodiment of the invention. In step S200, a plurality of logical pages are detected in sequence by the controller 120. In step S202, whether a logical page of the logical pages is currently-used or not is determined by the controller 120. The detection and determination for the currently-used logical page is illustrated before, and would not be repeated. Afterwards, in step S204, the controller 120 detects a logical page of the previous logical address of the logical page. In step S206, the controller 120 detects whether the logical page of the previous logical address is currently-used or not.

When the controller 120 detects that the logical page of the previous logical address is currently-used, step S208 will be executed that the controller 120 determines the logical page to be the last truly currently-used logical page. In step S210, the data storage method finishes. When the controller 120 detects that the logical page of the previous logical address is not currently-used, step S212 will be executed that the controller 120 determines the logical page to be a misjudged currently-used logical page. In other words, when the logical page of the previous logical address is not currently-used, it means that the logical page is not real currently-used logical page and the logical page is misjudged by an abnormal power-off. Afterwards, step S204 is executed so that the controller 120 keeps detecting logical page of another previous logical address until finding the real last currently-used logical page.

Figure 3:
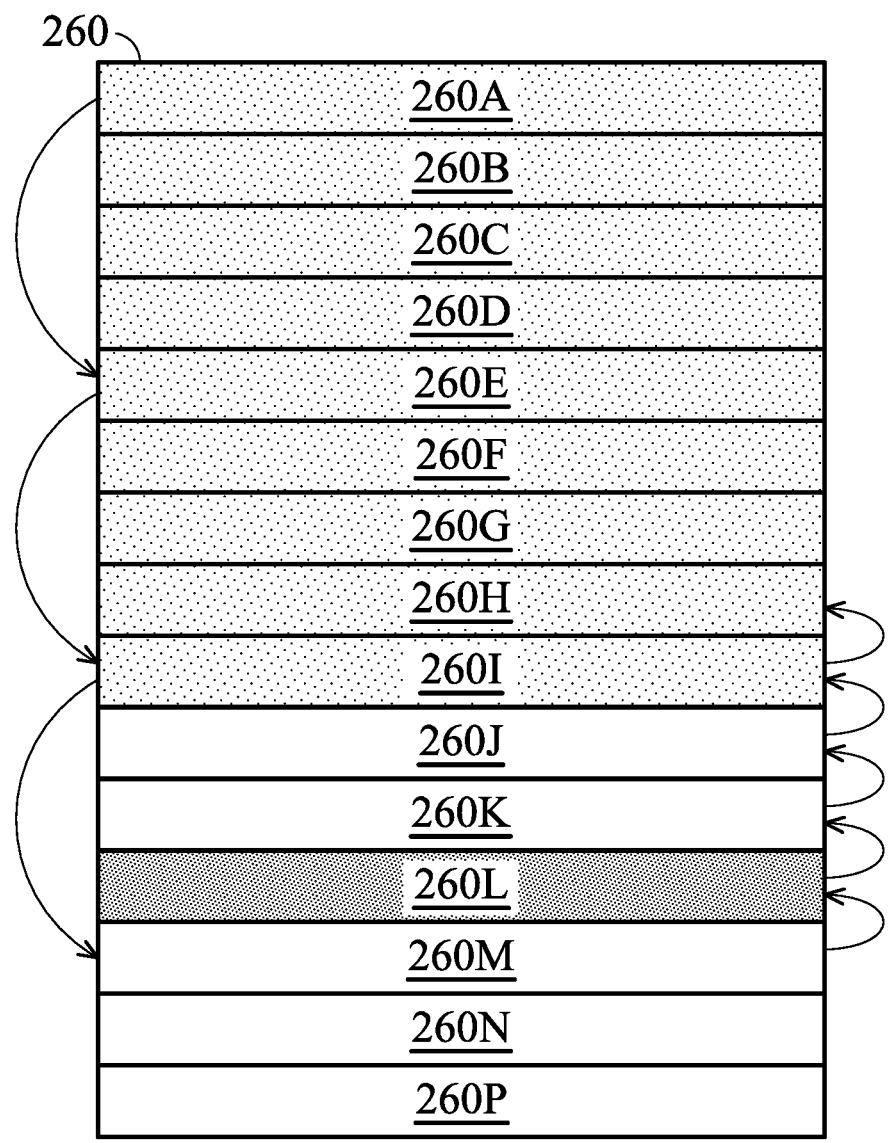
FIG. 3 is a schematic diagram of a logical page according to an embodiment of the invention.

FIG. 3 is a schematic diagram of logical pages 260A-260P according to an embodiment of the invention. In the embodiment, the logical block 260 includes multiple logical pages 260A-260P, and the logical pages 260A-260P are written sequentially. As shown in FIG. 3, logical pages 260A-260I indicated by a light color are real currently-used logical pages with written data, the logical pages 260J-K without indication and the logical page 260L indicated by a dark color are blank logical pages without written data. Because an abnormal power-off occurs when writing the logical page 260I, another logical page 260L on the same word line is also damaged. In other words, the logical page 260I is a Least Significant Bit (LSB) of a word line, and the logical page 260L is the Most Significant Bit (MSB) of the same word line. The logical page 260L is a blank page without written data originally, which means that the each bit stored on the logical page 260L is 1. Since the logical page 260L is affected by an abnormal power-off, a portion of the bits become 0, and the controller 120 might determine that the logical page is a currently-used logical page rather than a blank page.

In the embodiment of FIG. 3, multiple logical pages 260A-260P are inspected back and forth by the controller 120 according to the leaping linear search. In other words, the controller 120 does not detect the multiple logical pages 260A-260P one by one. Since the logical block 260 includes many logical pages, it spends too much time to detect them one by one. Therefore, the leaping linear search is executed to improve the detection efficiency. The controller 120 detects logical pages 260A, 260E, 260I and 260M, and returns to detect the logical page 260L.

It should be noted that, when the controller 120 detects that logical page 260L (the first logical page) is currently-used, the controller 120 will detect whether or not the logical page 260K (the second logical page) of the previous logical address of the logical page 260L is currently-used. Accordingly, the last real currently-used logical page of the logical pages 260A-260P can be found. In the embodiment, the controller 120 detects that the logical page 260K is not current-used (which means the blank page). Therefore, the controller 120 determines that the logical page 260L is a misjudged currently-used logical page, and it keeps detecting whether or not the logical page 260J (the third logical page) of the previous logical address of the logical page 260K is currently-used.

Furthermore, when the controller 120 detects that the logical page 260K is currently-used, it determines that the logical page 260L is the last real currently-used logical page. Since the logical pages 260K and 260L belong to different word lines, the logical page 260K will not be affected by the abnormal power-off which has occurred on the logical page 260I. Therefore, by determining the status of data of the logical page 260K, whether the logical page 260L is really currently-used or not can be determined.

Well-known data storage methods cannot be utilized to determine whether the logical page 260L is real logical page or not. When the logical page 260L is misjudged to be the last real logical page, the controller 120 will start to write data from the logical page 260M of the next logical address. As such, the blank logical pages 260J and 260K will be ignored by the controller without having any data written into them. Regarding the logical block 260, a portion of the logical pages will be blank and will not be programmed, which might result in data loss or damage. The real last currently-used logical page can be accurately determined by the present invention. Therefore, a situation wherein blank pages are ignored can be avoided, thereby improving the reliability of the data storage device 100.

In another embodiment, when the controller 120 detects that the logical page 260K is not a currently-used logical page, it determines that the logical page 260L is a misjudged currently-used logical page and keeps detecting the logical page 260J of another previous logical address. When the controller 120 detects that the logical page 260J is a currently-used logical page, it determines that the logical page 260K is a real last currently-used logical page. When the controller 120 detects that the logical page 260J is not a currently-used logical page, it determines that the logical page 260K is a misjudged currently-used logical page and keeps detecting whether or not the logical page 260I (the fourth logical page) of the previous logical address of the logical page 260J is a currently-used logical page.

Figure 4:
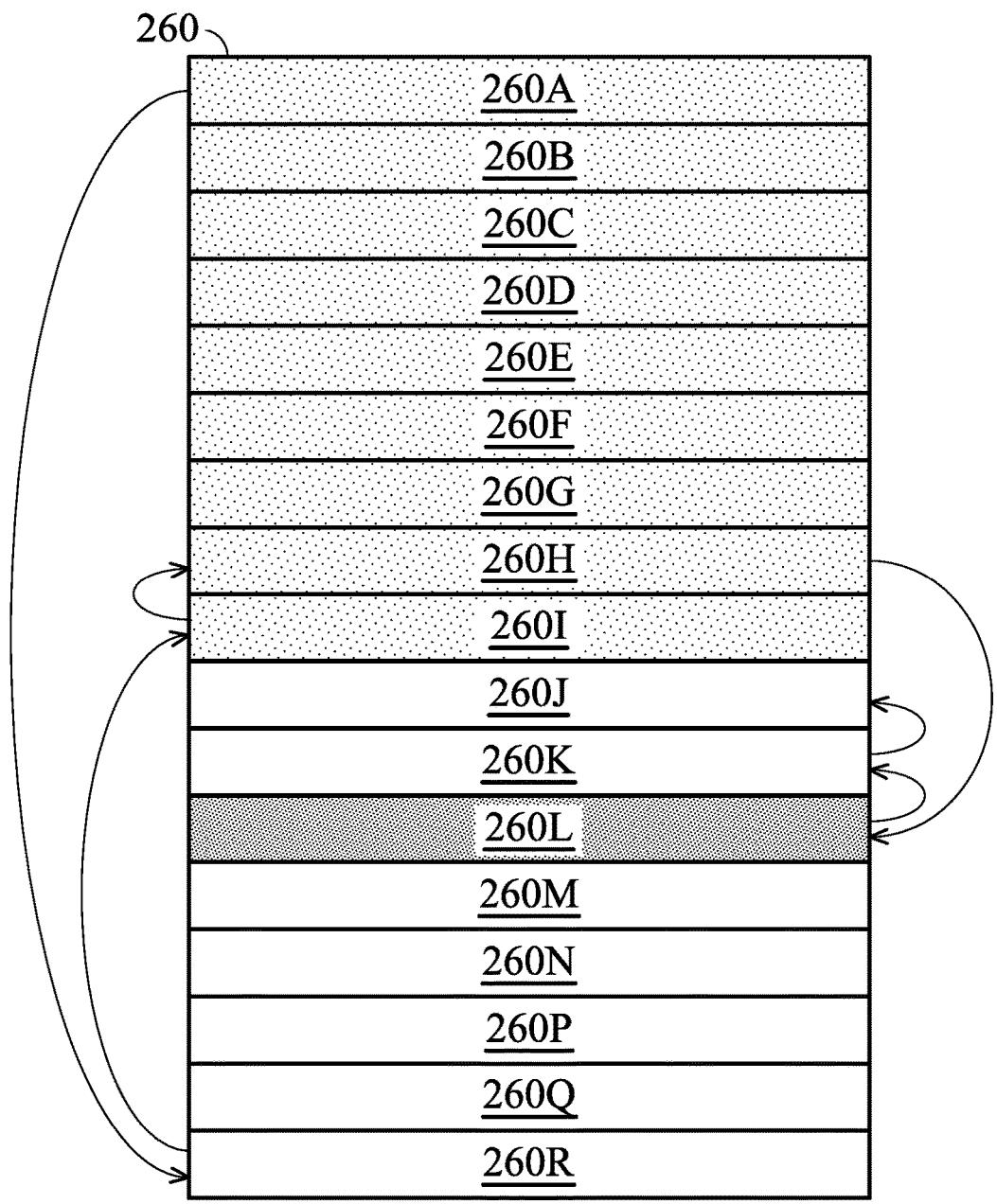
FIG. 4 is a schematic diagram of a logical page according to another embodiment of the invention.

FIG. 4 is a schematic diagram of a logical page according to another embodiment of the invention. Logical pages 260A-260I indicated by a light color are real currently-used logical pages with written data, the logical pages 260J-K and 260M-R without indication, and the logical page 260L indicated by a dark color, are blank logical pages without any written data. Multiple logical pages 260A-260R are detected back and forth by the controller 120 according to the binary search. As shown in FIG. 4, the controller 120 detects the initial logical page 260A and the last logical page 260R at first, afterwards, it detects the logical page 260I on the middle portion. Because the logical page 260I is detected to be the currently-used logical page, the controller 120 detects the logical page 260H of another previous logical address. Since the logical page 260H is also currently-used, the controller 120 determines that the logical page 260I is a real currently-used logical page which stores data.

It should be noted that, although the logical page 260L is actually a blank page, it is determined to be a currently-used logical page due to an abnormal power-off. In the embodiment, the controller 120 detects the logical page 260K of another logical address. Because the logical page 260K is not currently-used, the controller 120 determines that the logical page 260L is a misjudged currently-used logical page. In other words, the controller 120 determines that the logical page is not a real currently-used logical page and the logical page is a misjudged blank page due to the abnormal power-off.

By utilizing the data storage device and data storage method of the present invention, when a currently-used logical page is detected, the page of the previous address of the detected page will be further detected to determine whether it is currently-used or not. If the page of the previous address is a blank page, it means that the page is not a real currently-used page. If the page of the previous address is a currently-used page, it means that the page is a real currently-used page. Therefore, the data storage device and data storage method of the present invention can avoid misjudgments and discover the real last currently-used page.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it is to be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, utilized for storing a plurality of data, comprising:

a memory, comprising a plurality of blocks, wherein each of the blocks comprises a plurality of physical pages; and a controller, coupled to the memory, mapping a plurality of logical pages to the physical pages of the memory, wherein when the controller detects that a first logical page of the logical pages is a currently-used logical page, the controller detects whether a second logical page of previous logical address of the first logical page is the currently-used logical page or not, to discover a last currently-used logical page of the logical pages.

2. The data storage device as claimed in claim 1, wherein when the controller detects that the second logical page is not the currently-used logical page, the controller determines that the first logical page is a misjudged currently-used logical page, and keeps detecting whether a third logical page of previous logical address of the second logical page is the currently-used logical page or not.

3. The data storage device as claimed in claim 2, wherein when the controller detects that the second logical page is the currently-used logical page, the controller determines that the first logical page is truly the last currently-used logical page.

4. The data storage device as claimed in claim 2, wherein when the controller detects that the third logical page is the currently-used logical page, the controller determines that the second logical page is truly the last currently-used logical page.

5. The data storage device as claimed in claim 4, wherein when the controller detects that the third logical page is not the currently-used logical page, the controller determines that the second logical page is the misjudged currently-used logical page, and keeps detecting whether a fourth logical page of previous logical address of the third logical page is the currently-used logical page or not.

6. The data storage device as claimed in claim 1, wherein the controller sequentially detects whether each of the logical pages is the currently-used logical page or not according to a leaping linear search or a binary search.

7. The data storage device as claimed in claim 1, wherein the first logical page and the second logical page belong to different word lines.

8. The data storage device as claimed in claim 1, wherein when not every bit of the logical page is 1, the controller determines that the logical page is the currently-used logical page.

9. The data storage device as claimed in claim 8, wherein whether each bit of the logical page is 1 or not is determined by hardware.

10. The data storage device as claimed in claim 1, wherein when ECC occurs on the logical page, the controller determines that the logical page is the currently-used logical page.

11. A data storage method, utilized by a data storage device for storing a plurality of data, wherein the data storage device comprises a memory and a controller, and the controller maps a plurality of logical pages to the physical pages of the memory, the data storage method comprising:
  detecting whether a first logical page of the logical pages is a currently-used logical page or not;
  when the first logical page of the logical pages is detected to be the currently-used logical page, detecting whether a second logical page of previous logical address of the first logical page is the currently-used logical page or not, to discover a last currently-used logical page of the logical pages.

12. The data storage method as claimed in claim 11, wherein when the second logical page is not the currently-used logical page, determining that the first logical page is a misjudged currently-used logical page, and keeping detecting whether a third logical page of previous logical address of the second logical page is the currently-used logical page or not.

13. The data storage method as claimed in claim 12, when the second logical page is detected to be the currently-used logical page, determining that the first logical page is truly the last currently-used logical page.

14. The data storage method as claimed in claim 12, when the third logical page is detected to be the currently-used logical page, determining that the second logical page is truly the last currently-used logical page.

15. The data storage method as claimed in claim 14, when the third logical page is not the currently-used logical page, determining that the second logical page is the misjudged currently-used logical page, and keeping detecting whether a fourth logical page of previous logical address of the third logical page is the currently-used logical page or not.

16. The data storage method as claimed in claim 11, wherein when not every bit of the logical page is 1, determining that the logical page is the currently-used logical page.

17. The data storage method as claimed in claim 11, wherein when ECC occurs on the logical page, determining that the logical page is the currently-used logical page.

* * * * *